United States Patent
Bernhard et al.

(10) Patent No.: US 6,851,542 B2
(45) Date of Patent: Feb. 8, 2005

(54) WORK CARRIER CHANGEOVER DEVICE FOR MACHINE TOOLS

(75) Inventors: Franz-Xaver Bernhard, Spaichingen (DE); Rainer Kohler, Hausen o.V. (DE)

(73) Assignee: Maschinenfabrik Berthold Hermle AG, Gosheim (DE)

( * ) Notice: Subject to any disclaimer, the term of this patent is extended or adjusted under 35 U.S.C. 154(b) by 19 days.

(21) Appl. No.: 10/376,328

(22) Filed: Mar. 3, 2003

(65) Prior Publication Data

US 2004/0079617 A1 Apr. 29, 2004

(30) Foreign Application Priority Data

Mar. 2, 2002 (EP) ............................................. 02004835

(51) Int. Cl.⁷ ............................................. B65G 43/00
(52) U.S. Cl. .................................... 198/346.1; 29/33 P
(58) Field of Search .......................... 198/346.1, 346.2; 29/33 P

(56) References Cited

U.S. PATENT DOCUMENTS

| | | | | |
|---|---|---|---|---|
| 4,637,108 A | * | 1/1987 | Murata et al. .............. | 29/33 P |
| 4,797,052 A | * | 1/1989 | Ohta et al. ................ | 198/346.1 |
| 4,934,031 A | * | 6/1990 | Maeda et al. ............... | 29/33 P |
| 5,018,617 A | * | 5/1991 | Miyata et al. ............. | 198/346.1 |
| 5,370,212 A | * | 12/1994 | Mizutani et al. ......... | 198/346.1 |
| 5,768,768 A | | 6/1998 | Best | |
| 5,992,608 A | | 11/1999 | Ahn | |
| 6,679,369 B2 | * | 1/2004 | Okuyama ................ | 198/346.1 |

FOREIGN PATENT DOCUMENTS

| | | |
|---|---|---|
| DE | 195 13 827 A1 | 10/1996 |
| DE | 100 20 804 A1 | 11/2001 |
| EP | 0 409 085 A1 | 1/1991 |
| EP | 1 084 794 A1 | 3/2000 |

* cited by examiner

*Primary Examiner*—James R. Bidwell
(74) *Attorney, Agent, or Firm*—Browdy and Neikmark, P.L.L.C.

(57) ABSTRACT

The invention concerns a work carrier changeover device for machine tools, with a work carrier transfer device for moving the work carrier (16) between a machining station (15) and a tooling station (21). The work carrier transfer device has a coupling element (25) rotatable around a vertical axis and two opposing coupling points (26, 27) for the coupling of work carriers (16). The coupling element (25) is pivotably mounted at free end section of a swivel arm (24) capable of swivelling around a vertical axis.

16 Claims, 5 Drawing Sheets

WORK CARRIER CHANGEOVER DEVICE FOR MACHINE TOOLS

BACKGROUND OF THE INVENTION

1. Technical Field of the Invention

The invention relates to a work carrier changeover device for machine tools, with a work carrier transfer device for moving the work carrier between a machining station and a tooling station, wherein the work carrier transfer device has a coupling element rotatable around a vertical axis and with two opposing coupling points for the coupling of work carriers.

2. Prior Art

In a changeover device of this kind known from EP 0409085 B1, a coupling element for work carriers, capable of rotating through 180°, is located on the machine itself, while a linear work carrier traversing station is also required to bring the work carriers, each provided with workpieces, to the machining station. Besides the poor accessibility to the working area due to the direct mounting of the changeover device on the machine, the traversing station takes up a large amount of space. Subsequent attachment to a standard machine is generally impossible. Attachment to the machine brings about inadequate decoupling between machining station and setting-up station so that there is a danger that, during the setting-up process, i.e. during the loading of the work carrier with new workpieces at the setting-up station, machining at the machining station is adversely affected. A further drawback lies in the fact that, due to the transfer by means of swivel and linear movements, the work carrier changeover takes an unsatisfactory length of time.

Known from DE 19513827 A1 and DE 10020804 A1 are work carrier changeover devices which are fully integrated in the machine and which require no linear movements. In this case, subsequent attachment to a standard machine would mean even greater expense, which would make such attachment virtually impossible. In actual-time parallel tooling, the integration of tooling station and machining station means that vibrations and forces are transmitted to the machining table, which has a negative effect on the accuracy of machining. Automatic loading by means of a handling system is therefore even more problematic. Another drawback is the poor accessibility to the machining station due to the platen shuttle being rigidly attached to the machine.

Finally, EP 1084794 A1 discloses a work carrier changeover device with a handling system in which the work carrier is brought from a pallet shelf unit to the machining station by a loading unit. While this certainly leads to good decoupling of machining station and tooling station, and provides good accessibility to the working area, there is a very high space requirement together with an expensive and cost-intensive design, while the work carrier changeover requires a relatively large amount of time.

OBJECT AND SUMMARY OF THE INVENTION

A problem of the present invention is to create a work carrier changeover device which provides good decoupling between machining station and tooling station and good accessibility to the machining station, with a simple and cost-effective design which permits rapid work carrier changeover and may easily be retrofitted to standard machines.

This problem is solved according to the invention by providing that the coupling element is pivotably mounted at the free end section of a swivel arm capable of swivelling around a vertical axis.

The benefits of the solution according to the invention are in particular that, because of the horizontally pivotable swivel arm with rotatably mounted coupling element, only one mechanical sub-assembly is required for feeding and changeover of the swivelling work carrier and pallets. The coupling element is not attached rigidly to the machine, but instead is mounted on a swivel arm which is independent of the machine, thereby ensuring on the one hand easy retrofitting capability and on the other hand good decoupling between machine and tooling station. The working area of the machine tool remains readily accessible, since the swivel arm may be swivelled away. Due to the superposition of a swivelling and a rotary movement, it is possible for the coupling element to traverse along a predetermined, optimised, curved path. This makes possible a rapid changeover of pallets, even where space is restricted.

The separate arrangement of the tooling station makes possible automatic loading and unloading of pallets at this point using a feed unit located at the setting-up station, for example a conveyor belt.

Advantageous developments and improvements of the work carrier changeover device specified in claim 1 are possible through the measures set out in the subsidiary claims.

The swivel axis of the swivel arm is expediently offset to the side of the access zone of the machining station, in order to allow the best possible access to the machining area. The access zone is provided with a closable door assembly, which in particular may be controlled electronically, to allow passage of the swivel arm for loading and unloading of work carriers.

In order to superimpose swivelling and rotary movements of the swivel arm and coupling element a crank mechanism, which may be driven by the movement of the swivel arm, is provided to drive the coupling element. This may expediently be a so-called four-bar mechanism. As an alternative to this, it is also possible to provide an electrical or fluidic actuator for the coupling element, which may be controlled by an electronic control unit to obtain superimposed movement.

The machining station machine expediently has a worktable, which is provided with means of accommodating and fixing work carriers.

The coupling element and/or the swivel arm are provided with a vertical lifting device, wherein the coupling points of the coupling element are formed by a vertical lift for coupling to the work carriers from below. The coupling points of the coupling element are preferably provided with non-positive or positive retaining means for releasable fixing of work carriers, for example with an hydraulic releasing and clamping system, to ensure safe changeover of the work carriers and workpieces, some of which are very heavy. With smaller work carriers, a positive means of retention may be adequate.

The tooling station is designed as an independent station, separate from the machine tool, thereby ensuring on the one hand reliable decoupling, and on the other hand easy retrofitting of machines.

The tooling station is expediently provided with a swivel door assembly, which is located on a wall forming an outer space in front of the access zone to the machining station, wherein in a first operating position the tooling station is integrated in this outer space, and in a second operating position the tooling station is separated from this outer space. This enables the operator, in the one operating position, to reach the tooling station too from the access zone to the machining station. In the second operating position, the swivel door assembly closes between the machining station and the tooling station, so as to shield the working area from water spray, enabling the pallet to be cleaned in the tooling station for example using compressed air or spray.

BRIEF DESCRIPTION OF THE DRAWINGS

An embodiment of the invention is shown in the drawing and explained in detail in the description which follows. The drawing shows as.

DETAILED DESCRIPTION OF THE PREFERRED EMBODIMENTS OF THE INVENTION

Figure 1:
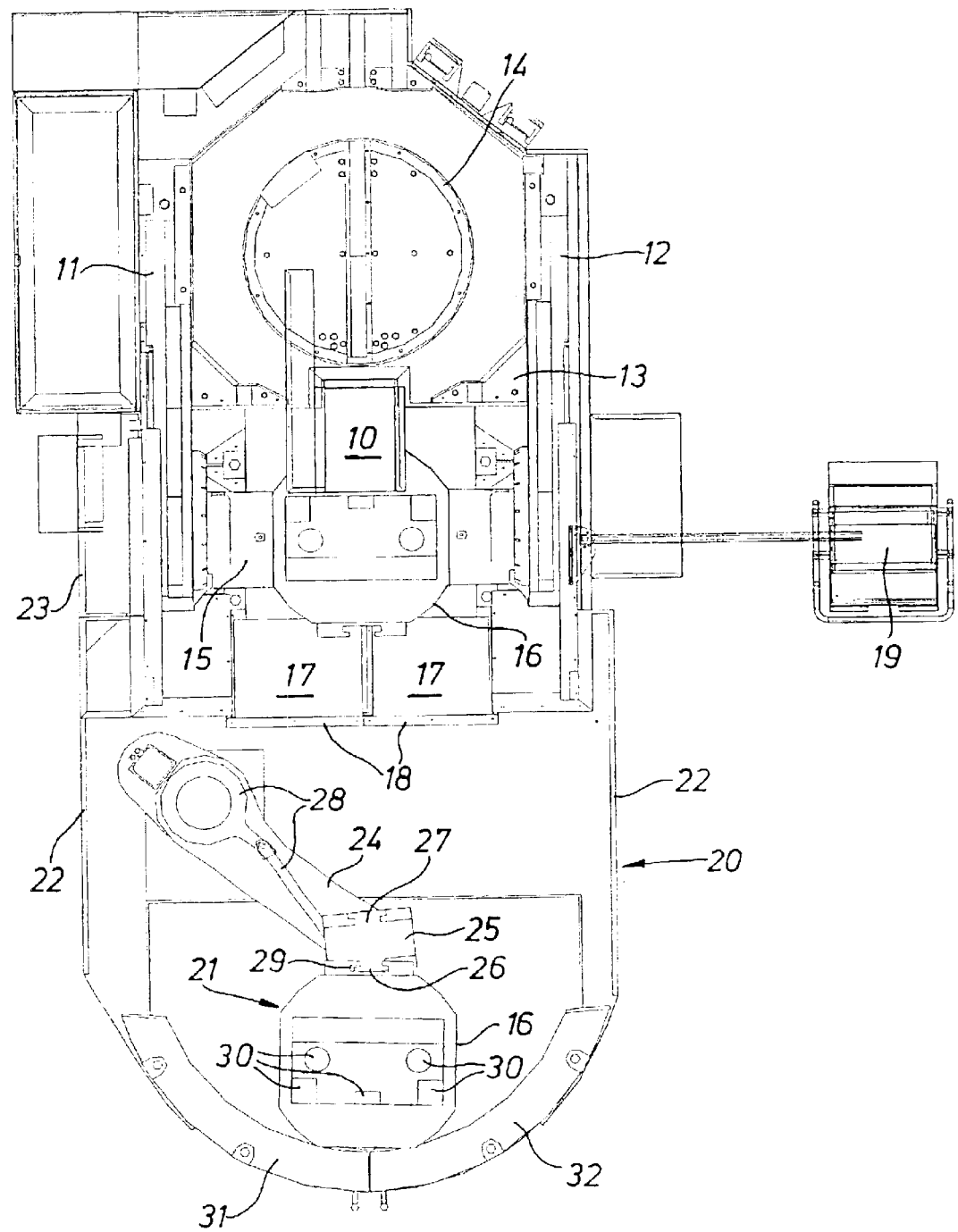
FIG. 1 a view from above of a machine tool provided with a work carrier changeover device, during uncoupling of a work pallet at the tooling station, FIG. 2 the same arrangement, with the tooling station separated from the working area by the swivel door assembly, FIG. 3 the same arrangement during coupling of the coupling element to a work carrier in the machining station, FIG. 4 the same arrangement during movement of the swivel arm and the coupling element from the machining station to the tooling station, FIG. 5 the same arrangement during the coupling of the coupling element already provided at one end with the work carrier fetched from the machining station, to a work carrier in the tooling station, FIG. 6 the same arrangement with the coupling element rotated through 180°, and FIG. 7 the same arrangement during uncoupling at the tooling station of the work carrier fetched from the machining station.

The machine tool shown in the Figures has a vertical spindle nose 10 and is in gantry form. A slide 13 is able to traverse horizontally on two side walls 11, 12 of the machine column. The spindle nose 10 is able to traverse at right-angles and vertically to its front side. Shown schematically in the rear area of the machine column is a tool-change magazine 14. Between the side walls 11, 12 and below the spindle nose 10, a swivelling rotary table is pivotably mounted around a horizontal axis for the direct accommodation of work or to accommodate work carriers in the form of work pallets 16. The access zone 17 in front of the swivelling rotary table 15 forming the machining station may be closed by doors 18 which may be slid sideways or upwards or hinged up. Located at the side of the machine tool is a control console 19 which may be swivelled in and out.

The depicted variant of the machine tools is only an example, i.e. the work carrier changeover device or work pallet changeover device 20 described below may in principle be mounted on any desired machine tool to move work pallets 16 between a tooling station 21 outside the machine tool and the machining station of the machine tool, which in the embodiment is the swivelling rotary table 15. So, instead of a swivelling rotary table 15, any other work accommodation designed for the fixing in place of work pallets may be provided. This purpose may for example be served by an intrinsically known hydraulic release and clamping system with "male" and "female" contours. In the simplest case, a fixed worktable may be provided.

The work carrier changeover device 20 is in the form of a cubicle with a cubicle wall 22 which is attached or fitted to or set up on the machine tool wall 23. Within the cubicle and cubicle wall 22, a swivel arm 24 is capable of swivelling horizontally around a vertical swivel axis. The swivel axis is here located to the side of the access zone 17 to the machining station, so as not to impede free access to the access zone 17. At the free end section of the swivel arm 24, a coupling element 25 for coupling two work pallets 16 to opposing coupling points 26, 27 is mounted so as to pivot around a vertical axis. The drive for rotation of the coupling element 25 is effected via a crank mechanism 28 as a function of the rotation of the swivel arm 24. A so-called four-bar mechanism may for example be used for this purpose. By means of this crank mechanism 28, the superposition of the swivel movement of the swivel arm 24 on the rotation of the coupling element 25 may be set as to obtain an optimal transfer of work pallets 16 between the tooling station 21 and the swivelling rotary table 15. As an alternative to a crank mechanism 28, rotation of the coupling element 25 may also be electronically controlled via an electrical or fluidic actuator.

To couple work pallets 16 to the coupling element 25, the coupling points 26, 27 are designed as mating projections which engage in corresponding mating recesses 29. In each case this is effected from below, for which purpose the coupling element 25 and/or the swivel arm 24 are or is provided with a vertical lifting device, not shown in detail. If the coupling points 26 or 27 are each inserted from below into such a mating recess 29 in a work pallet 16 as a positive fastening, a force-closed fixing may also be effected, for example via an hydraulic release and clamping system. In the case of smaller pallets, such a force-closed fixing may also be dispensed with.

In the position according to FIG. 1, a work pallet 16 provided with machined workpieces 30 is set down at the tooling station 21, by downwards movement of the coupling element 25 after the release of any existing fastening. At the same time the work pallet 16 is set down on a setting-up table, not illustrated and for example in the form of a rotary table, of the tooling station 21. During this process, workpieces arranged on a second work pallet 16 are machined at the machining station, i.e. on the swivelling rotary table 15 by tools on the spindle nose 10.

Figure 2:
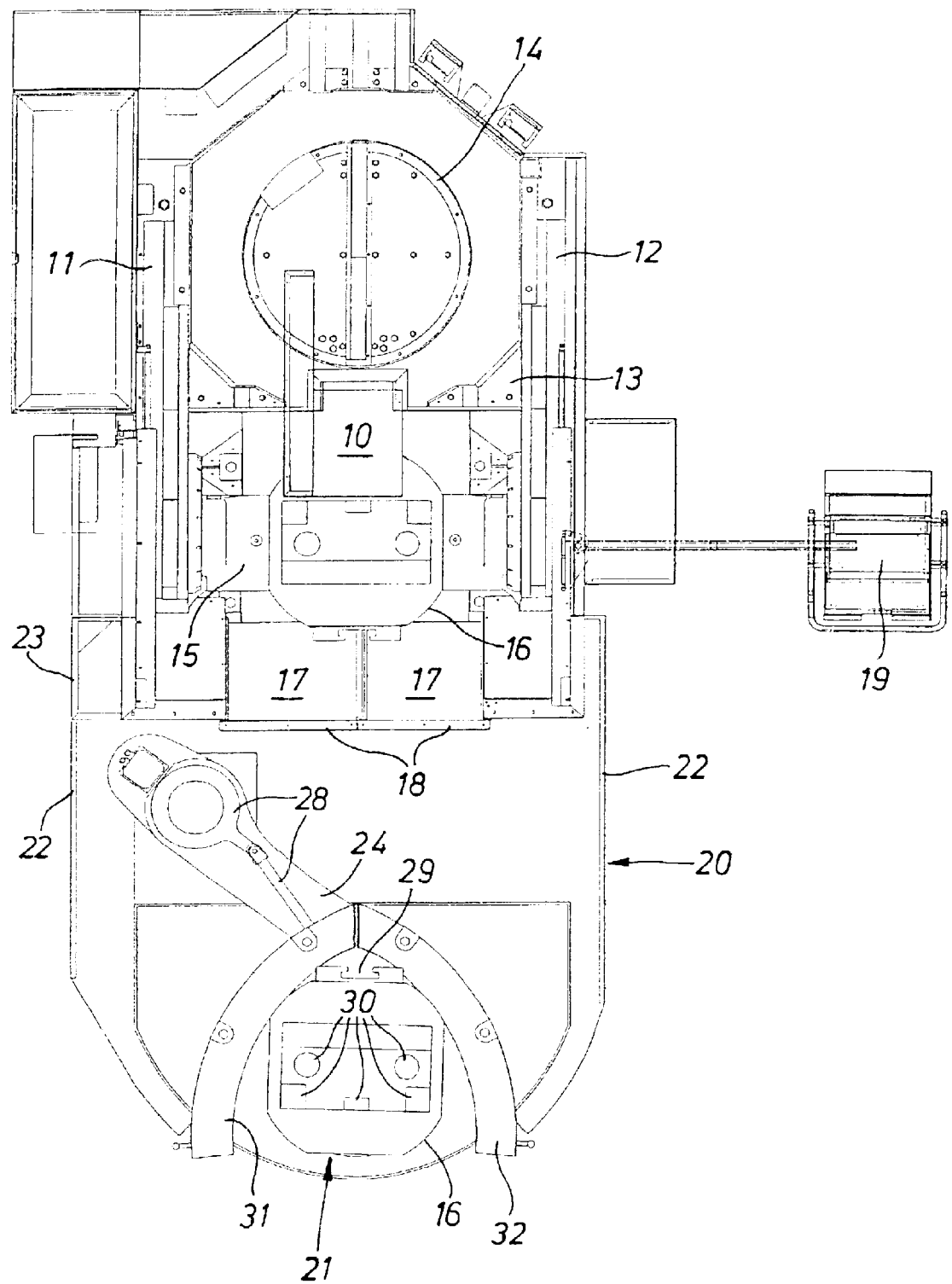

The cubicle wall 22 of the tooling or changeover cubicle has two curved swivel doors 31, 32, which close off the area of the tooling cubicle facing away from the machine tool. To clean work pallets 16 set up on the tooling station 21 and for loading, the swivel doors 31, 32 may as shown in FIG. 2 be so swivelled inwards that they separate the tooling station 21 from the remainder of the interior of the tooling cubicle. The tooling cubicle or changeover cubicle is now shielded from spray water and the work pallet 16 may be cleaned by compressed air and/or spray guns. The work pallet 16 is then replaced by another with unmachined workpieces, or is loaded with unmachined workpieces. During this process the swivel doors 31, 32 may remain in the shielding position shown in FIG. 2, and are then swung back again into the original position shown in FIG. 1. Depending on the method of feeding new work pallets, the swivel doors 31, 32 may also be swung back into the original position even beforehand.

Figure 3:
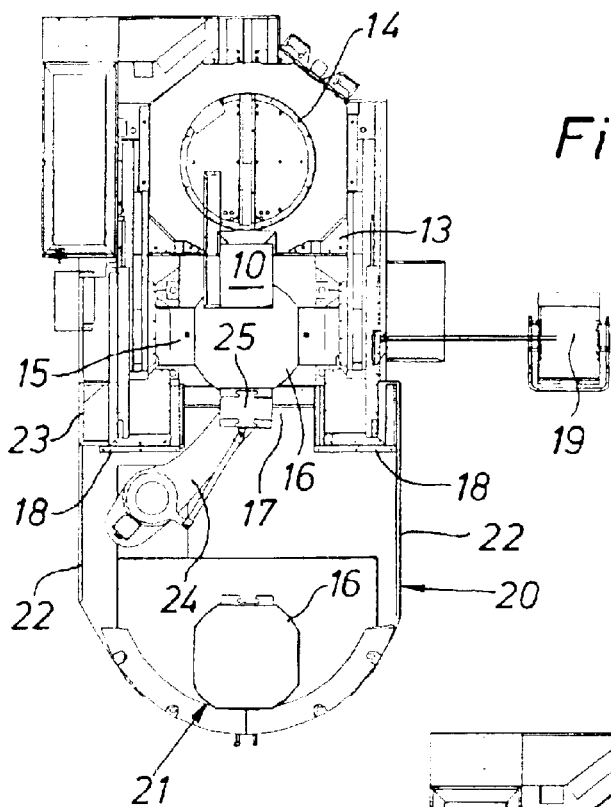

After, before or during the changeover at the tooling station 21, the swivel arm now swivels towards the swivelling rotary table 15 as shown in FIG. 3, while the doors 18 at the access zone 17 of the machine tool open automatically. Raising of the coupling element 25 results in coupling to the work pallet 16 located on the swivelling rotary table 15. By means of this vertical lifting, the work pallet 16 is also raised from the swivelling rotary table 15, following previous release of the fastening. This is effected automatically, just like any additional fixing to the coupling element 25.

Figure 4:
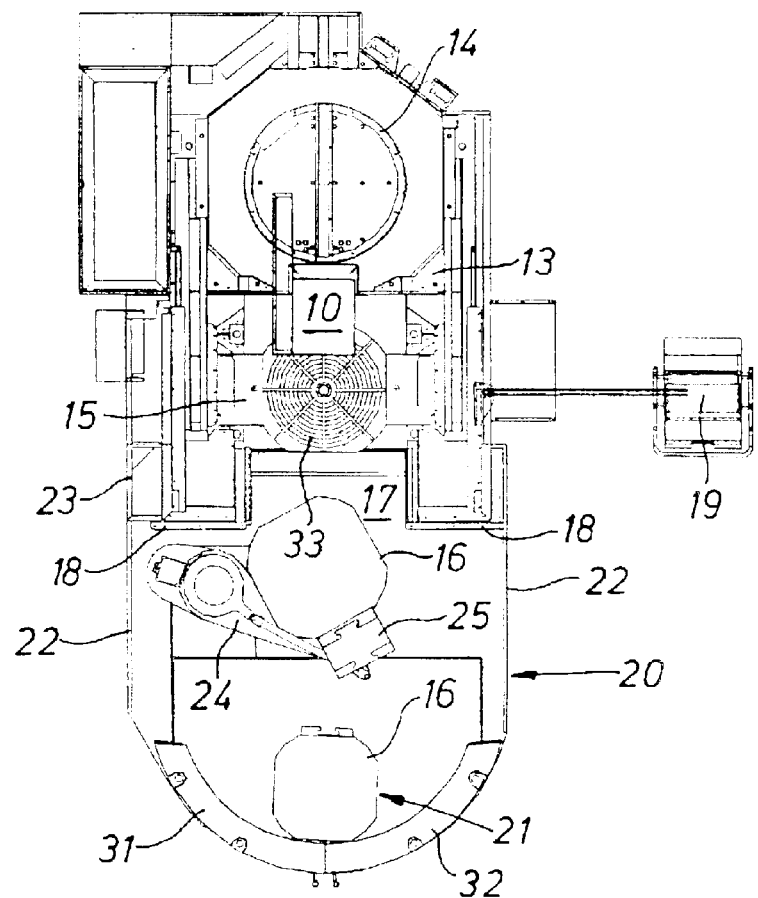
Figure 5:
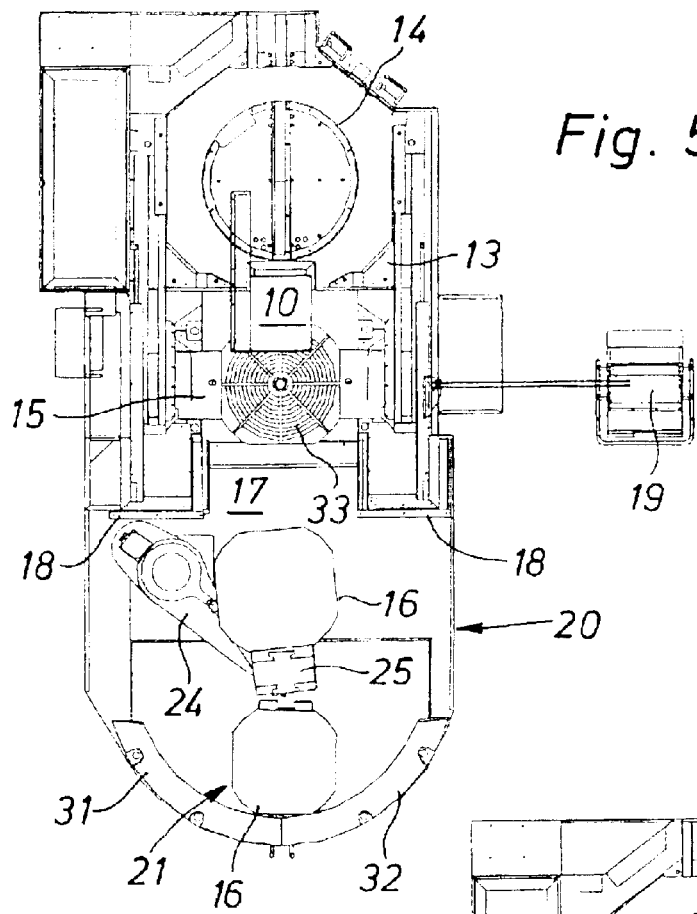
Figure 6:
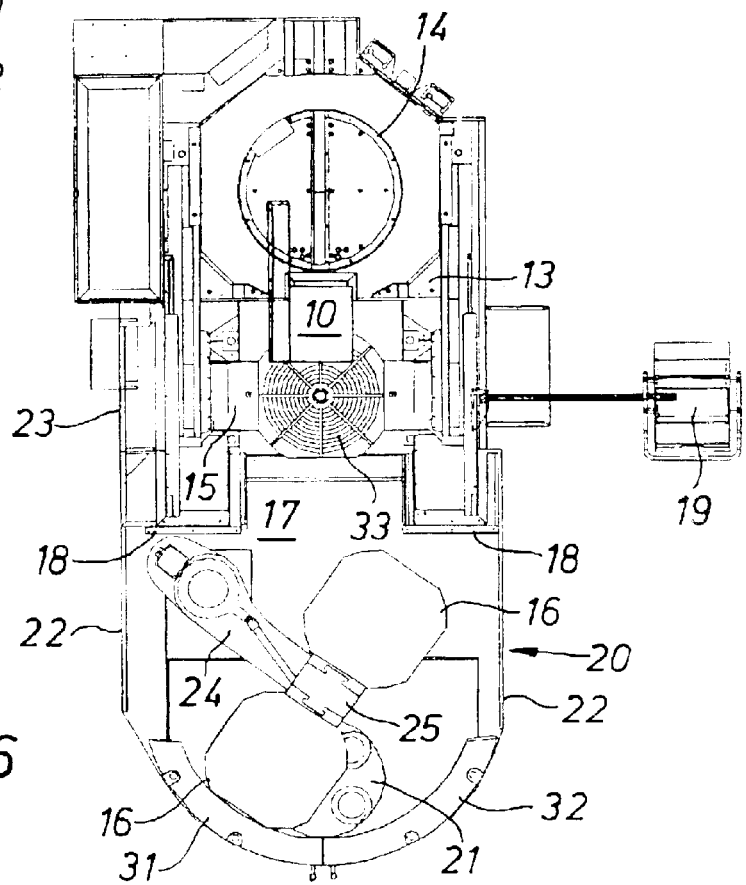
Figure 7:
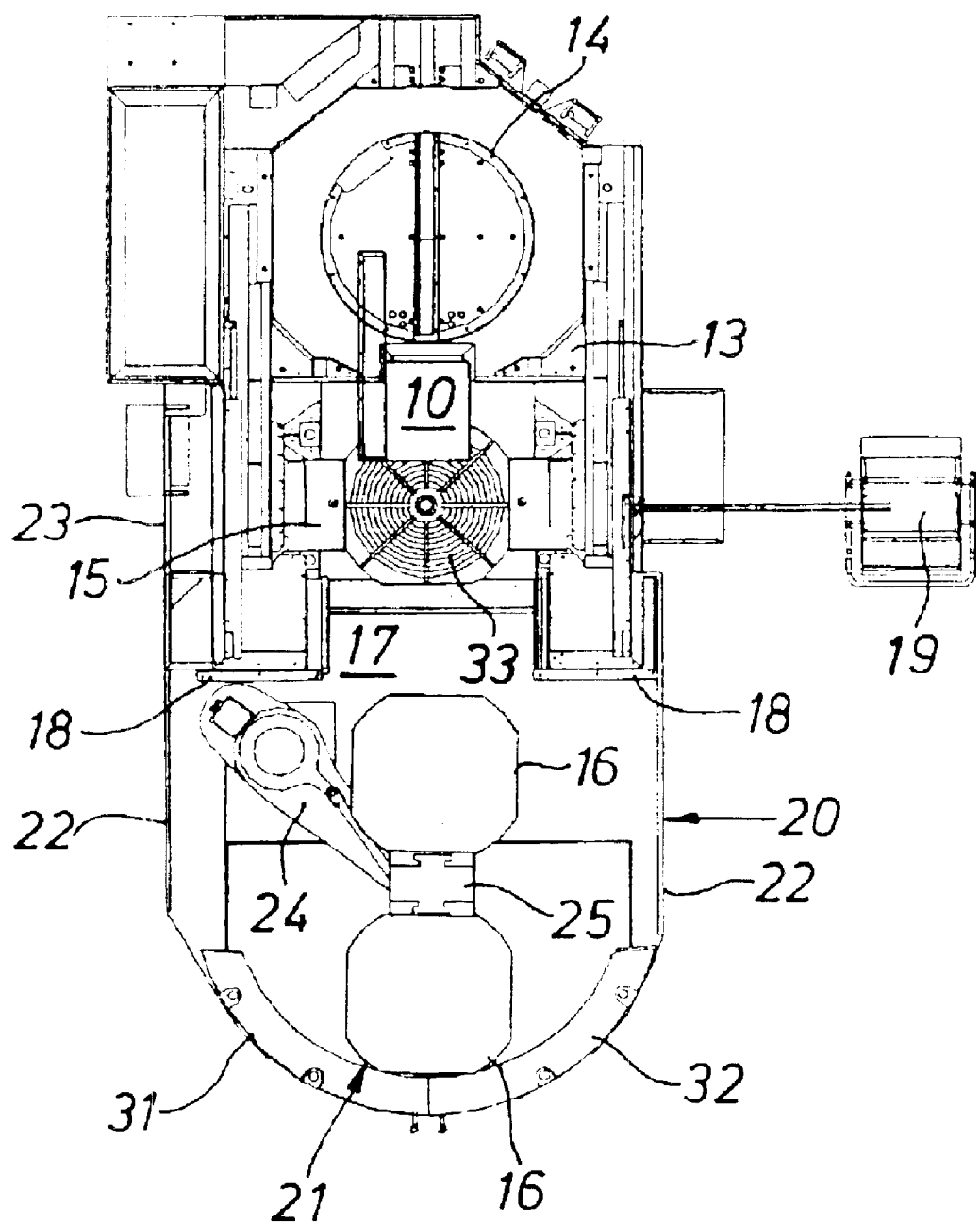

In accordance with FIG. 4 the work pallet 16 with machined workpieces, which are not shown for simplicity, and which is coupled to the swivel arm 24 and coupling element 25 respectively, moves back. By suitable superposition of the swivel movement of the swivel arm 24 and the rotary movement of the coupling element 25, it is possible to set up an optimal movement of the work pallet 16 through the access zone 17 to the tooling station 21, which is achieved in the illustration of FIG. 5. There the coupling element 25 is coupled to the work pallet 16 with unmachined workpieces which is deposited at that point. After coupling in the manner described, the coupling element 25 rotates through 180° as shown in FIG. 6. FIG. 7 shows the position at the end of this rotation. The work pallet 16 with the machined workpieces is now placed on the tooling station 21 by lowering and uncoupling, and the work pallet 16 with the unmachined workpieces which still remains on the coupling element 25 is moved to the swivelling rotary table 15 in accordance with FIG. 3, where it is uncoupled and set down, whereupon automatic fixing or clamping to the swivelling rotary table 15 is effected.

What is claimed is:

1. Work carrier changeover device for machine tools, with a work carrier transfer device for moving the work carrier (16) between a machining station (15) and a tooling station (21), wherein the work carrier transfer device has a coupling element (25) rotatable around a vertical axis and with two opposing coupling points (26, 27) for the coupling of work carriers (16), wherein the coupling element (25) is pivotably mounted at a free end section of a swivel arm (24) capable of swivelling around a vertical axis,
wherein the swivel axis of the swivel arm (24) is offset to the side of an access zone (17) of the machining station (15).

2. Work carrier changeover device according to claim 1, characterised in that the access zone (17) is provided with a closable door assembly (18), controllable automatically or electronically.

3. Work carrier changeover device according to any one of the preceding claims, characterised in that a crank mechanism (28), which drivable by the movement of the swivel arm (24), is provided to drive the coupling element (25).

4. Work carrier changeover device according to any one of claims 1 to 2, characterised in that an electrical or fluidic actuator is provided for the coupling element (25) and is controllable by an electronic control unit in accordance with the movement of the swivel arm (24).

5. Work carrier changeover device according to claim 1, characterised in that the machining station (15) has a worktable provided with means for the holding and locating of work carriers (16).

6. Work carrier changeover device according to claim 1, characterised in that the coupling element (25) and/or the swivel arm (24) is or are provided with a vertical lifting device, and that the coupling points (26, 27) of the coupling element (25) are formed by a vertical lift for coupling to the work carriers (16) from below.

7. Work carrier changeover device according to claim 1, characterised in that the coupling points (26, 27) of the coupling element (25) are provided with non-positive or positive retaining means for releasable fixing of work carriers (16).

8. Work carrier changeover device according to claim 1, characterised in that the tooling station (21) is constructed as an independent station, separate from the machine tool.

9. Work carrier changeover device according to claim 8, characterised in that a swivel door assembly (31, 32) is provided on a cabin wall (22) forming an outer space in front of the access zone (17) to the machining station (15) and, in a first operating position the tooling station (21) engages in this outer space, and in a second setting the tooling station (21) moves away from this outer space.

10. Work carrier changeover device according to claim 5, characterised in that the coupling element (25) and/or the swivel arm (24) is or are provided with a vertical lifting device, and that the coupling points (26, 27) of the coupling element (25) are formed by a vertical lift for coupling to the work carriers (16) from below.

11. Work carrier changeover device according to claim 10, characterised in that the coupling points (26, 27) of the coupling element (25) are provided with non-positive or positive retaining means for releasable fixing of work carriers (16).

12. Work carrier changeover device according to claim 11, characterised in that the tooling station (21) is constructed as an independent station, separate from the machine tool.

13. Work carrier changeover device according to claim 12, characterised in that a swivel door assembly (31, 32) is provided on a cabin wall (22) forming an outer space in front of the access zone (17) to the machining station (15) and, in a first operating position the tooling station (21) engages in this outer space, and in a second setting the tooling station (21) moves away from this outer space.

14. Work carrier changeover device for machine tools, with a work carrier transfer device for moving the work carrier (16) between a machining station (15) and a tooling station (21), wherein the work carrier transfer device has a coupling element (25) rotatable around a vertical axis and with two opposing coupling points (26, 27) for the coupling of work carriers (16), wherein the coupling element (25) is pivotably mounted at a free end section of a swivel arm (24) capable of swivelling around a vertical axis,
wherein a crank mechanism (28), which is drivable by the movement of the swivel arm (24), is provided to drive the coupling element (25).

15. Work carrier changeover device for machine tools, with a work carrier transfer device for moving the work carrier (16) between a machining station (15) and a tooling station (21), wherein the work carrier transfer device has a coupling element (25) rotatable around a vertical axis and with two opposing coupling points (26, 27) for the coupling of work carriers (16), wherein the coupling element (25) is pivotably mounted at a free end section of a swivel arm (24) capable of swivelling around a vertical axis,
wherein an electrical or fluidic actuator is provided for the coupling element (25) and is controllable by an electronic control unit in accordance with the movement of the swivel arm (24).

16. Work carrier changeover device for machine tools, with a work carrier transfer device for moving the work carrier (16) between a machining station (15) and a tooling station (21), wherein the work carrier transfer device has a coupling element (25) rotatable around a vertical axis and with two opposing coupling points (26, 27) for the coupling of work carriers (16), wherein the coupling element (25) is pivotably mounted at a free end section of a swivel arm (24) capable of swivelling around a vertical axis, wherein the tooling station (21) is constructed as an independent station, separate from the machine tool, and wherein a swivel door assembly (31, 32) is provided on a cabin wall (22) forming an outer space in front of the access zone (17) to the machining station (15) and, in a first operating position the tooling station (21) engages in this outer space, and in a second setting the tooling station (21) moves away from this outer space.

* * * * *